Dec. 28, 1926.
J. R. FEHR
1,612,712
DOMESTIC APPLIANCE
Filed Nov. 23, 1923
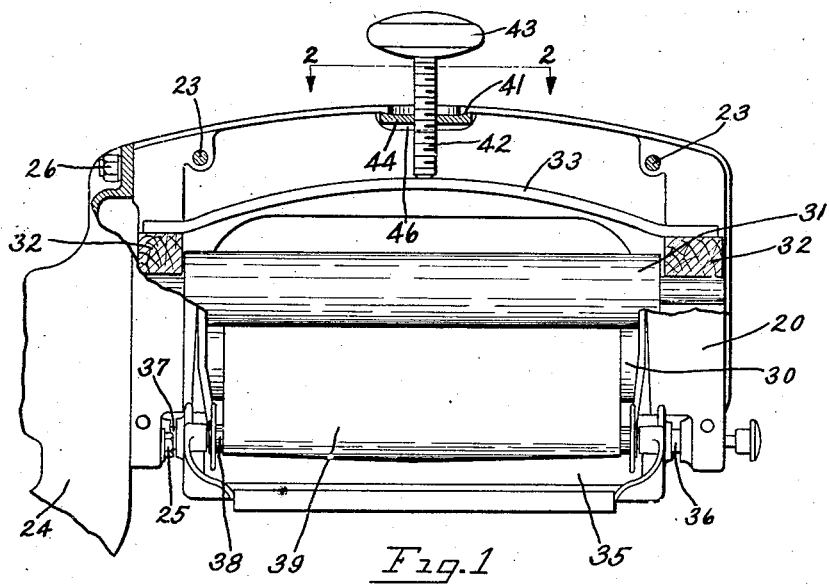
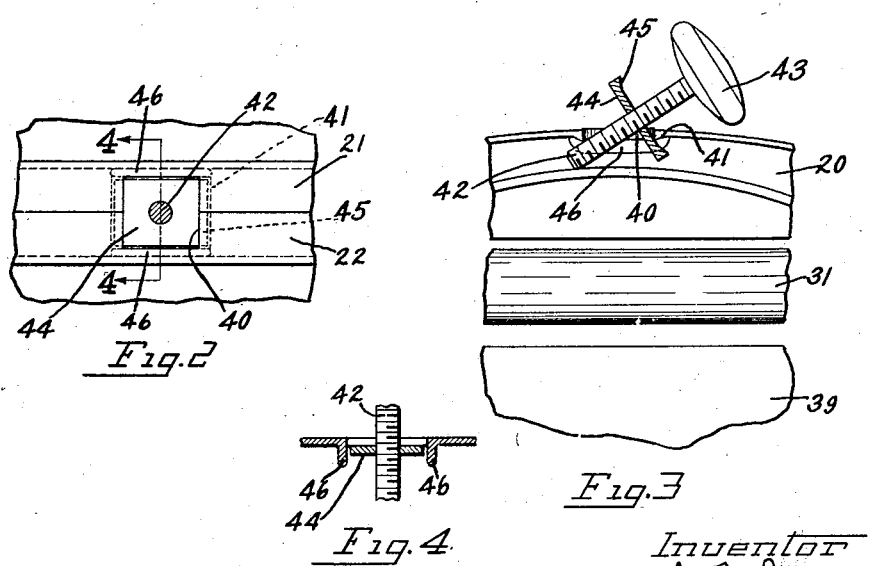
Inventor
John Ralph Fehr
By Spencer, Sewall + Hardman
His Attorneys Patented Dec. 28, 1926.

1,612,712

UNITED STATES PATENT OFFICE.

JOHN RALPH FEHR, OF DAYTON, OHIO, ASSIGNOR TO DELCO-LIGHT COMPANY, OF DAYTON, OHIO, A CORPORATION OF DELAWARE.

DOMESTIC APPLIANCE.

Application filed November 23, 1923. Serial No. 676,662.

This invention relates to wringers, and more particularly to devices for varying pressure between the wringer rolls, an object thereof being to provide a simple and reliable device for quickly releasing the pressure between said rolls.

In one form of the invention, this object is accomplished by providing a wringer with a single operating handle which can be used for adjusting the roll pressure and for quickly releasing the pressure between the rolls.

Further objects and advantages of the present invention will be apparent from the following description, reference being had to the accompanying drawings, wherein a preferred form of embodiment of the present invention is clearly shown.

In the drawings:

Fig. 1 is a side view of a wringer with a part of the wringer frame broken away to more clearly show the present invention in its operative position with pressure applied to the wringer roll.

Fig. 2 is a sectional view taken on the line 2—2 of Fig. 1.

Fig. 3 is a fragmentary side view similar to Fig. 1, showing the adjusting device in its non-operative position with the pressure on the wringer roll released.

Fig. 4 is a fragmentary sectional view taken on the line 4—4 of Fig. 2.

Referring to the drawings, a wringer frame 20 which may comprise two flanged sections 21 and 22 secured together as by bolts (not shown) passing through openings 23 in said sections, is secured to mounting bracket 24 by bolts 25 and 26. Frame 20 supports wringer rolls 30 and 31 in the usual manner. Bearing blocks 32 rest on the shaft of upper wringer roll 31, and support the ends of a leaf spring 33 which is adapted to be actuated by a means to be described, for varying the pressure between rolls 30 and 31. A drain board 35 is pivoted to frame 20 by pins 36 and 37, and carries rollers 38 for supporting a conveyor belt 39 passing between rolls 30 and 31.

A rectangular opening 40 is provided in the top of frame 20, and at opposite ends of the opening 40 the inner face of frame 20 is provided with a surface 41 oblique to rolls 30 and 31. A screw 42, provided with a handle 43, passes through opening 40 and is adapted to engage the central portion of spring 33 for controlling pressure between rolls 30 and 31. A nut 44, which engages screw 42, is longer than the length of opening 40 and is provided with oblique surfaces 45 which cooperate with the companion surfaces 41 for the purpose of maintaining the nut in operative position.

When the screw 42 is in the position shown in Fig. 1, the spring 33, being under tension, tends to push upwardly on the screw 42 and thus cause the oblique surfaces 45 of nut 44 to frictionally engage the oblique surfaces 41 on frame 20 and prevent the nut 44 from turning when the screw 42 is rotated. The frame 20 is provided with flanges 46 to assist in preventing the nut turning and to guide the nut during certain movements thereof.

When it is desired quickly to release the pressure between rolls 30 and 31, the operator has only to strike the handle 43 in a direction parallel to the rolls, thus knocking the adjusting screw 42 from its vertical position shown in Fig. 1 to an inclined position shown in Fig. 3, and causing one end of nut 44 to slip out through the opening 40, thereby releasing the pressure between the rolls.

In order to restore pressure between rolls 30 and 31, the screw 42 may be unscrewed from the nut 44, and the nut 44 manually returned to the position shown in Fig. 1. The screw 42 may then be turned downwardly to exert pressure on spring 33 and thereby create pressure between rolls 30 and 31. The tension of spring 33 upwardly will cause oblique surfaces 41 and 45 to be frictionally engaged, thereby automatically centering screw 42 with respect to the opening 40.

It will be apparent from the foregoing description, that a single device has been provided for not only varying the pressure between the wringer rolls, but also for quickly releasing the pressure therebetween.

While the form of embodiment of the present invention as herein disclosed, constitutes a preferred form, it is to be understood that other forms might be adopted, all coming within the scope of the claims which follow.

What is claimed is as follows:

1. A wringer comprising, in combination, wringer rolls, an apertured frame for supporting said rolls and provided with surfaces oblique to said rolls adjacent the aperture, roll pressure means including a spring and a spring adjusting screw extending through said aperture, a nut adapted to pass through said aperture engaging said screw and provided with oblique surfaces adapted to engage the oblique surfaces on said frame, and a single handle for turning the screw to cause frictional engagement of said oblique surfaces whereby to permit adjustment of pressure between said rolls and for moving the screw transversely quickly to release pressure between said rolls.

2. A wringer comprising, in combination, a frame having an elongated aperture in the top wall thereof, pressure rolls journaled in bearings supported by the frame, and means for regulating the pressure between the rolls including a spring engaging the roll bearings, a nut normally engaging the inside wall of the frame surrounding said aperture and extending across said aperture, and a screw threadedly engaging said nut and bearing against said spring, said screw and nut being movable longitudinally of the aperture the size and shape of the nut being such that when the screw is moved longitudinally of the aperture the nut will be released from the frame and will move through said aperture.

In testimony whereof I hereunto affix my signature.

JOHN RALPH FEHR.